(12) United States Patent
Wang et al.

(10) Patent No.: US 8,616,147 B2
(45) Date of Patent: Dec. 31, 2013

(54) POINTER ILLUMINATION

(75) Inventors: Guoging Wang, Rochester Hills, MI (US); Vyacheslav B. Birman, Auburn Hills, MI (US); Ronald A. Struck, Flushing, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 340 days.

(21) Appl. No.: 12/992,653

(22) PCT Filed: May 13, 2009

(86) PCT No.: PCT/US2009/043709
§ 371 (c)(1),
(2), (4) Date: Nov. 15, 2010

(87) PCT Pub. No.: WO2009/140332
PCT Pub. Date: Nov. 19, 2009

(65) Prior Publication Data
US 2011/0061586 A1 Mar. 17, 2011

Related U.S. Application Data

(60) Provisional application No. 61/053,721, filed on May 16, 2008.

(51) Int. Cl.
*G01D 11/28* (2006.01)
*G01D 13/26* (2006.01)

(52) U.S. Cl.
USPC .. 116/288; 116/332; 116/DIG. 5; 116/DIG. 6

(58) Field of Classification Search
USPC ............... 116/286, 287, 288, DIG. 5, DIG. 6, 116/DIG. 36; 362/29, 30
See application file for complete search history.

(56) References Cited

U.S. PATENT DOCUMENTS

| | | | | |
|---|---|---|---|---|
| 4,300,470 A | * | 11/1981 | Furukawa | ....................... 116/332 |
| 4,848,264 A | * | 7/1989 | Knietzsch et al. | ............ 116/332 |
| 5,320,062 A | | 6/1994 | Masuda et al. | |
| 6,065,846 A | * | 5/2000 | Kato et al. | ....................... 362/30 |
| 6,120,158 A | | 9/2000 | Ishimaru et al. | |
| 6,817,310 B2 | * | 11/2004 | Sugiyama et al. | ........... 116/62.4 |
| 6,981,464 B2 | * | 1/2006 | Birman et al. | ................ 116/288 |
| 7,624,699 B2 | * | 12/2009 | Harada et al. | ................ 116/286 |
| 2002/0135995 A1 | | 9/2002 | Fujita et al. | |

(Continued)

FOREIGN PATENT DOCUMENTS

| | | | | |
|---|---|---|---|---|
| EP | 1010969 A1 | 6/2000 | | |
| EP | 1876426 A1 | 1/2008 | | |
| JP | 09033293 A | * | 2/1997 | ............. G01D 13/22 |
| JP | 09096551 A | * | 4/1997 | ............. G01D 11/28 |

OTHER PUBLICATIONS

International Search Report & Written Opinion mailed on Oct. 29, 2009 for PCT/US2009/043709.

(Continued)

*Primary Examiner* — R. A. Smith

(57) ABSTRACT

A disclosed instrument cluster includes dial gauges with an illuminated pointer including light reflecting features for uniformly distributing light within the pointer. The light deflecting structure directs light toward tip of the pointer by reflecting the light of each of the first and second sides. The light deflecting structure provides the desired distribution of luminescence by directing light toward the sides surfaces of the pointer.

20 Claims, 5 Drawing Sheets

(56) References Cited

U.S. PATENT DOCUMENTS

2004/0004826 A1   1/2004   Wakaki et al.
2005/0162843 A1*  7/2005   Lee et al. ........................ 362/30

OTHER PUBLICATIONS

International Preliminary Report on Patentability mailed on Nov. 25, 2010 for Application No. PCT/US2009/043709.

* cited by examiner

POINTER ILLUMINATION

The application claims priority to U.S. Provisional Application No. 61/053,721 which was filed on May 16, 2008.

BACKGROUND

An instrument cluster includes a plurality of gauges for communicating information indicative of a vehicle operating condition. Each gauge can include a pointer assembly that rotates relative to a plurality of markings that provides a measurement of a vehicle operating condition such as vehicle speed. The vehicle instrument cluster is visible to an operator of a vehicle and is an integral part of the vehicle aesthetic appearance.

In some instances it is desired to provide an illuminated pointer to further highlight the operating condition and provide a desired appearance. Disadvantageously, a pointer can include spots of greater illumination that detract for the desired illuminated pointer appearance and can vary in brightness depending on a radial position.

Accordingly, it is desirable to design and develop an illuminated pointer with uniform illumination regardless of radial position.

SUMMARY

A disclosed instrument cluster includes dial gauges with an illuminated pointer including a light deflecting structure that minimizes variations based on a radial position of the pointer.

The example pointer assembly includes a light deflecting structure that directs light toward the tip of the pointer by not only reflecting light toward the tip of the pointer but also deflecting light toward first and second sides of the pointer. Further, the example light deflecting structure provides for a uniform distribution of luminescence output from the pointer even with uneven light input due to a radial position of the pointer.

An example light deflecting structure extends outwardly from the bottom surface and includes a series of angled surfaces that receive light and direct that light transverse relative to the bottom surface. The example deflecting structure is arranged to be longitudinally disposed on a light receiving surface of the pointer.

Accordingly, the deflecting structure of the example pointer reduces variations in luminescence in the pointer due to a position relative to light sources.

The various features and advantages of this invention will become apparent to those skilled in the art from the following detailed description. The drawings that accompany the detailed description can be briefly described as follows.

DETAILED DESCRIPTION

Figure 1:
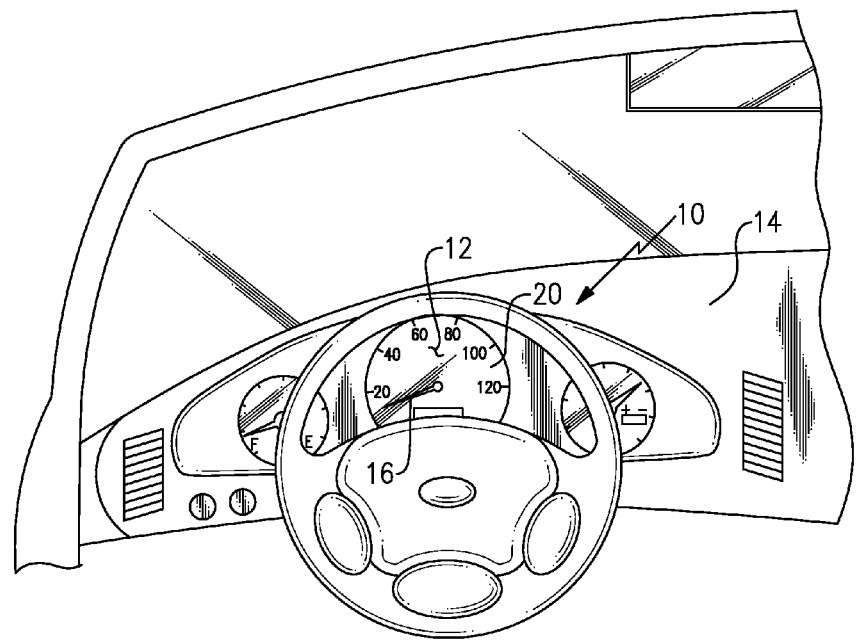
FIG. 1 is a schematic view of an example vehicle instrument cluster.

Referring to FIG. 1, an example instrument cluster 10 supported within a vehicle dashboard 14 includes dial gauges 12 for communicating a vehicle operating parameter to an operator. In this example, the dial gauge 12 includes markings that provide measurement of vehicle speed. As appreciated, other vehicle operating parameters, such as engine speed will also benefit from the disclosures within this application. The example dial gauge 12 includes a pointer 16 that rotates relative to the face of the dial gauge to indicate the current vehicle speed. The example pointer 16 is illuminated to provide a desired appearance to the vehicle operator.

Figure 2A:
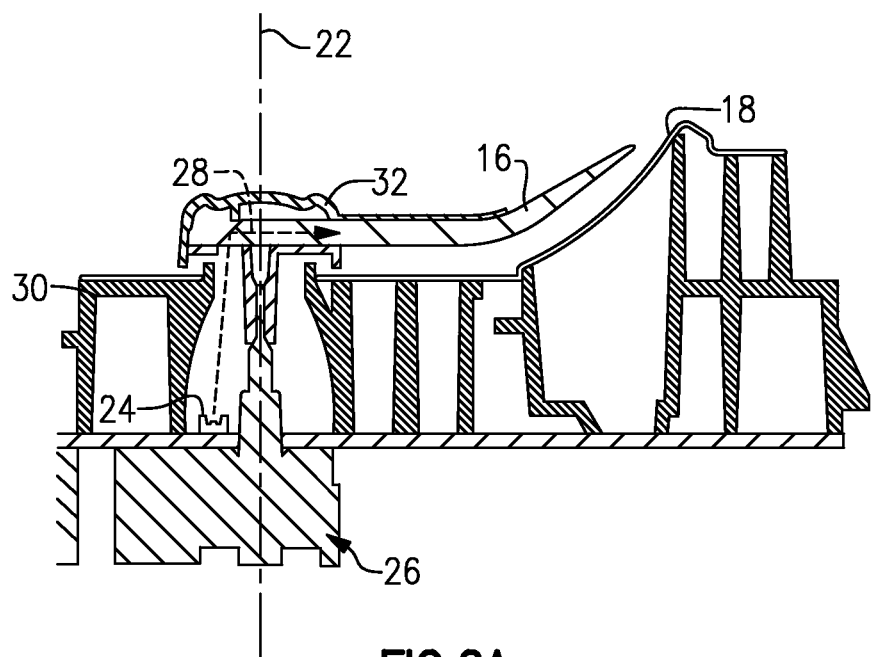
FIG. 2A is a cross-sectional view of an example dial gauge assembly.
Figure 2B:
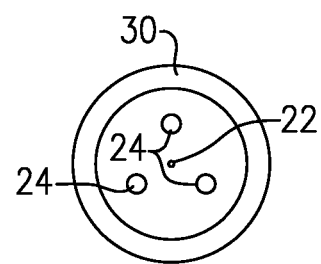
FIG. 2B is a cross-sectional view through the example light housing.

Referring to FIGS. 2A and 2B, with continued reference to FIG. 1, the example dial gauge 12 includes a dial face 18 with markings 20 that are indicated by the pointer 16. The example pointer 16 is illuminated by light sources 24 that are disposed below the pointer 16 and are spaced apart from the axis of rotation 22. A motor 26 provides for rotation of the pointer 16. The light sources 24 are disposed within a light housing 30 that directs light upwardly into the pointer assembly 16.

Figure 3:
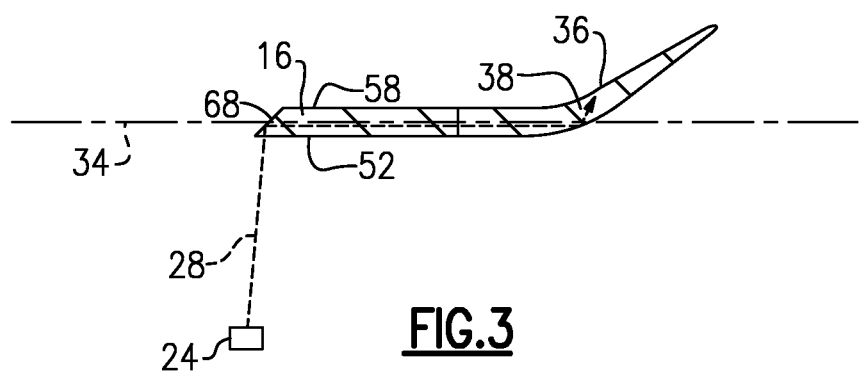
FIG. 3 is a cross-sectional view of an example pointer assembly.

Referring to FIGS. 2A, 2B and 3, light 28 from the light source 24 is directed into a bottom light receiving surface 52 of the pointer 16 and reflected longitudinally by reflecting surface 68 before being transmitted through top surface 58. A cap 32 is disposed over the pointer 16 and along the axis 22. The example reflecting surface 68 redirects light transversely along axis 34 through the pointer 16 toward the tip. However, merely directing light transversely can result in a non-uniform distribution of light within the pointer assembly 16. The example pointer 16 directs light upward at a bend 38 into a bent portion 36.

Referring to FIGS. 4-7, the example pointer 16 includes a light deflecting structure 40 that directs light 50 toward the first and second sides 42, 44 such that light is not focused against a bottom surface 52 of the pointer 16. The light 50 directed against the sides of the pointer 16 creates a uniform distribution of light within the pointer 16.

Figure 6:
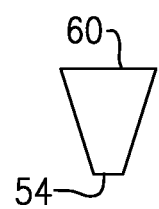
FIG. 6 is a cross-sectional view of another portion of the example pointer assembly.
Figure 7:
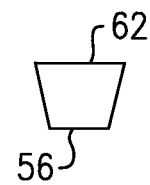
FIG. 7 is a cross-sectional view of yet another portion of the example pointer assembly.

Further features of the example pointer 16 include a varying cross-sectional shape and area to uniformly distribute light. The bottom surface 52 is one width that decreases toward a middle section as shown in FIG. 6 with a bottom surface having a smaller width 54. The width increases past the middle portion as shown in end portion shown in FIG. 7 with a bottom surface 56. The top surface 58 above the light deflecting structure 40 is different than the bottom surface 52. A corresponding top surface of the middle portion 60, that is also larger than the corresponding bottom surface 54. The top surface 62 is also larger than the bottom surface 56 of the end portion. These features and selective widths are arranged to further provide a uniformly illuminated pointer 16.

Light 50 reflecting off the reflective surface 68 is directed at angle relative to the axis of rotation 22 of the pointer 16. The angle of the light directed off the reflective surface 68 provides the angular component that results in light being directed off of side surfaces of the pointer 16.

The varying width and shape of the example pointer 16 aids in achieving a substantially uniform distribution of luminescence. However, the light deflecting structure 40 provides the desired distribution of light by redirecting light to reflect of the sides surfaces of the pointer 16.

Figure 4:
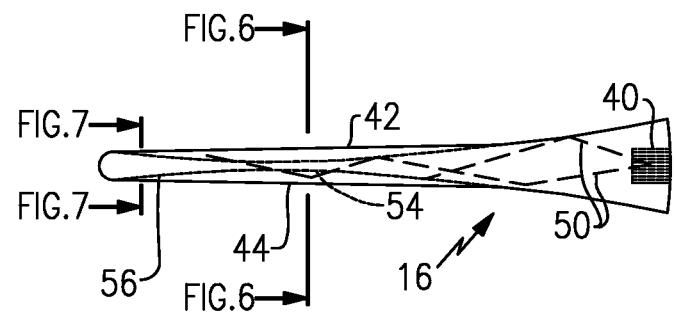
FIG. 4 is another cross-sectional view of example pointer assembly.
Figure 5:
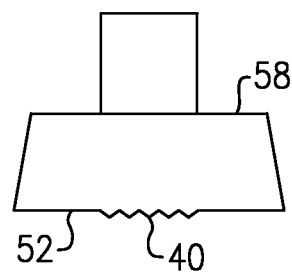
FIG. 5 is a cross-sectional view of a portion of the example pointer assembly.
Figure 8:
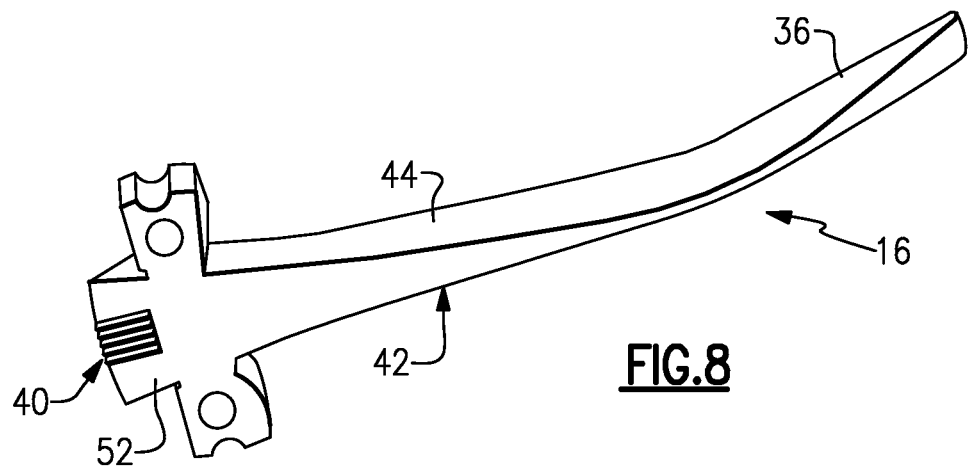
FIG. 8 is a perspective view of the example pointer assembly.
Figure 9:
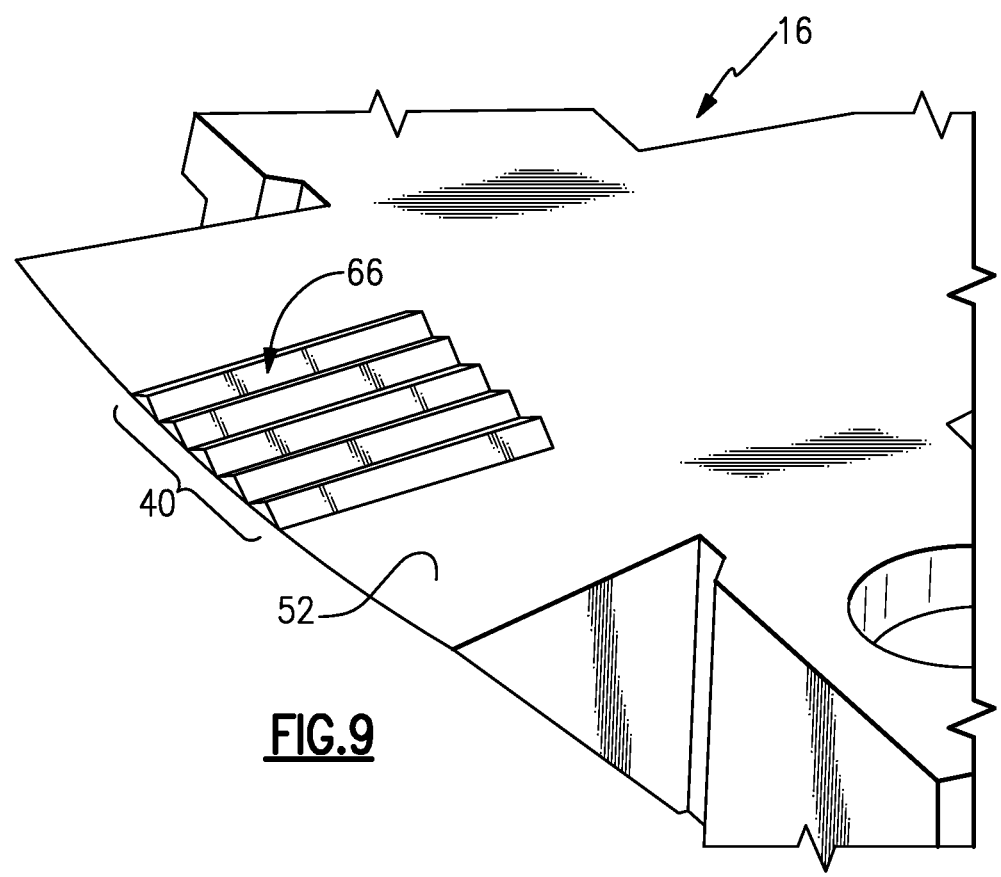
FIG. 9 is another perspective view of the example pointer assembly.

Referring to FIGS. 8 and 9, the light deflecting structure 40 extends outwardly from the bottom surface 53. The example light deflecting structure 40 comprises a series of angled surfaces 66 that receive light and direct that light at an angle relative to the bottom surface 52. In other words, light entering the light receiving surface is normally simply deflecting from the reflecting surface straight toward the tip. The deflecting structure 40 deflects the light at an angle relative to the axis of rotation. The added angle as best shown in FIG. 4, causes light to also deflect of each of the first and second side walls 42, 44.

The example light deflecting structure 40 is disposed on a portion of the bottom surface 52 through which light is received. Light entering the pointer 16 through the light deflecting structure is reflected not only longitudinally along the length of the pointer, but is also directed transversely to reflect of each of the side walls 44, 42.

Further, the example deflecting structure 40 is arranged to be longitudinally disposed such that the length of the angled surfaces 66 extend toward the tip of the pointer 16. The example pointer 16 includes the bent portion 36 that corresponds with the shape of the example dial gauge assembly 12. However, straight pointers 16 will benefit equally from the deflection of light rays to the sides of the pointer 16 such that light is uniformly distributed throughout the pointer.

Although, the example deflecting structure 40 includes a series of angled surfaces 66, other shapes such as rounded features are also within the contemplation of this invention. Further, other shapes could be utilized to further tailor light distribution within the pointer 16.

Figure 10:
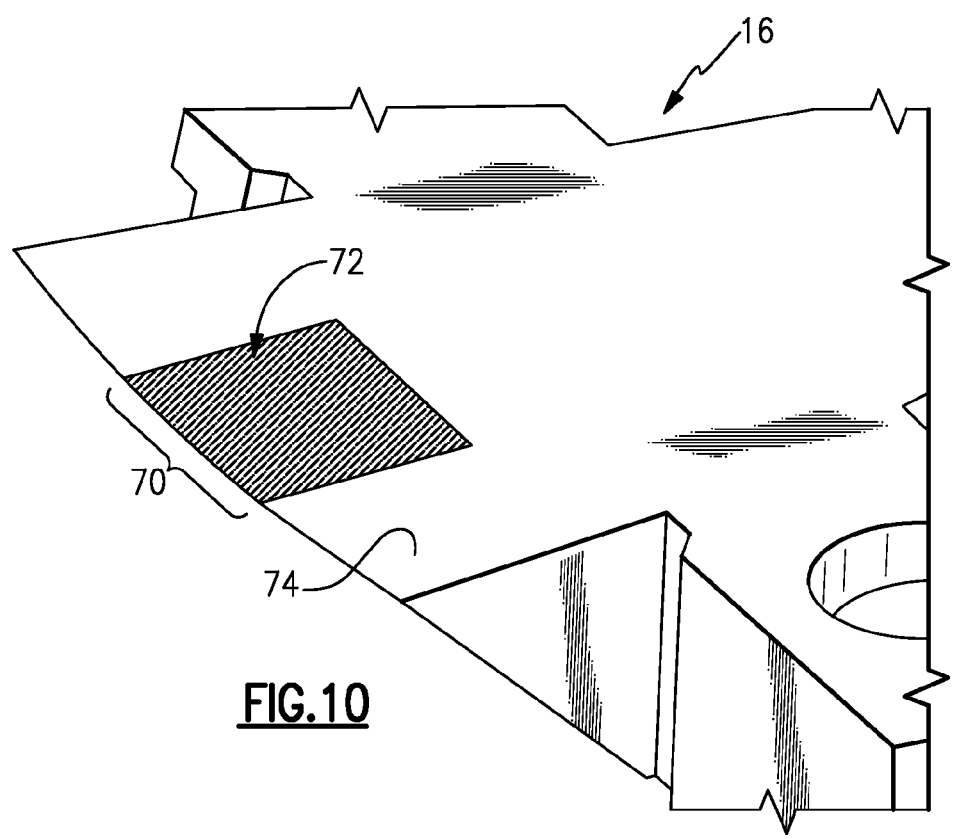
FIG. 10 is a perspective view of another example deflecting structure.

Referring to FIG. 10, another example deflecting structure 70 includes a textured surface 72 that provides for the desired redirection of light toward the sides of the pointer 16. The textured surface 72 is rougher than the surrounding surface texture 74 on the bottom surface 52 of the pointer. The resulting light deflection provides the desired distribution of light toward the tip along the sides of the pointer 16.

Accordingly, the deflecting structure 40 of the example pointer 16 generates the desired uniform illumination without complex features with light sources spaced apart about the axis of rotation of the pointer 16. The deflecting structure 40 along with the other features of the example pointer assembly provides a consistent luminescent pointer with a light input that varies based on a radial position of the pointer.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An instrument cluster assembly comprising:
    a dial gauge including markings indicative of a vehicle operating parameter;
    a pointer rotatable relative to the dial gauge, the pointer including a bottom width smaller than a top width, wherein the bottom width decreases in a direction toward a middle section of the pointer and increases in a direction toward a tip of the pointer; and
    at least one light source for directing light into the pointer, wherein the pointer includes a light receiving surface including a light deflecting structure that redirect light transverse to the light receiving surface.

2. The assembly as recited in claim 1, wherein the pointer includes a bottom surface including the light receiving surface, first and second sides and a top surface, said light deflecting structure redirects light toward the first and second side walls of the pointer.

3. The assembly as recited in claim 2, wherein the light deflecting structure comprises a plurality of angled surfaces extending outward from the light receiving surface.

4. The assembly as recited in claim 2, wherein the pointer includes a light reflecting surface that reflects light transverse to the light receiving surface and the light deflecting structure directs light at an angle relative to the axis of rotation onto the light reflecting surface.

5. The assembly as recited in claim 2, wherein the bottom includes a first width and the top includes a second width that is less than the first width.

6. The assembly as recited in claim 1, wherein the light deflecting structure extends toward the tip of the pointer.

7. The assembly as recited in claim 1, wherein the gauge face includes a curved surface and the pointer comprises a curve that corresponds with the curved surface of the gauge face.

8. The assembly as recited in claim 1, wherein the light deflecting structure comprises a textured surface having a texture rougher than the surrounding bottom surface of the pointer.

9. A gauge assembly for a vehicle comprising:
    a gauge face including a plurality of markings indicative of a vehicle operating condition;
    an illuminated pointer assembly rotatable relative to the gauge face, wherein the pointer assembly includes a bottom, top and first and second sides and the bottom side includes a minimum width at a middle section of the pointer;
    at least one light source for directing light into the pointer assembly, wherein the pointer assembly includes a light deflecting structure that redirects light from the light source against the first and second sides of the pointer assembly.

10. The assembly as recited in claim 9, wherein the light deflecting structure comprises a plurality of angled surfaces extending outward from the light receiving surface.

11. The assembly as recited in claim 10, wherein the angled surfaces extend toward the tip of the pointer.

12. The assembly as recited in claim 9, wherein the light deflecting structure is orientated longitudinally on the bottom surface of the pointer assembly.

13. The assembly as recited in claim 9, wherein the pointer includes a light reflecting surface that reflects light transverse to a light receiving surface and the light deflecting structure directs light at angle relative to an axis or rotation of the pointer onto the light reflecting surface.

14. The assembly as recited in claim 13, wherein the light deflecting surface is located in a center of the bottom surface of the light receiving surface.

15. The assembly as recited in claim 9, wherein the bottom includes a first width and the top includes a second width that is less than the first width.

16. The assembly as recited in claim 9, wherein the pointer is rotatable about an axis and in a first plane parallel to the gauge face and has a portion that extends transverse to the first plane.

17. The assembly as recited in claim 9, wherein the gauge face includes a curved surface and the pointer comprises a curve that corresponds with the curved surface of the gauge face.

18. The assembly as recited in claim 9, wherein the light deflecting structure comprises a textured surface having a texture rougher than the surrounding bottom surface of the pointer.

19. The assembly as recited in claim 9, wherein the width of the bottom side is at a minimum in the middle section and increases from the middle section toward a tip.

20. The assembly as recited in claim 19, wherein the width of the bottom side decreases in a direction from the light deflecting structure toward the middle section.

* * * * *